United States Patent [19]

Henderson et al.

[11] Patent Number: 5,854,786
[45] Date of Patent: Dec. 29, 1998

[54] METHOD AND APPARATUS FOR DISTRIBUTION/CONSOLIDATION (DISCO) INTERFACE UNITS FOR PACKET SWITCHED INTERCONNECTION SYSTEM

[75] Inventors: Eric L. Henderson; Houtan Dehesh; Farrokh Khatibi, all of San Diego; Richard Larson, Los Gatos; Todd R. Sutton, San Diego, all of Calif.; Lindsay A. Weaver, Jr., Boulder, Colo.; Kendrick Hoy Leong Yuen, San Diego, Calif.

[73] Assignee: QUALCOMM Incorporated, San Diego, Calif.

[21] Appl. No.: 513,306

[22] Filed: Aug. 9, 1995

[51] Int. Cl.⁶ .................................................. H04B 7/216
[52] U.S. Cl. .......................... 370/335; 370/395; 370/419; 370/218; 370/352; 370/902; 370/912; 371/48; 371/67.1
[58] Field of Search .................................. 370/335, 395, 370/396, 397, 390, 400, 419, 465, 248, 254, 537, 538, 535, 218, 352, 353, 904, 912; 371/32, 48, 37.7, 67.1

[56] References Cited

U.S. PATENT DOCUMENTS 4,985,889  1/1991  Frankish et al. ........................ 370/395
4,987,568  1/1991  Shinada et al. ......................... 370/249

*Primary Examiner*—Wellington Chin
*Assistant Examiner*—Melissa Kay Carman
*Attorney, Agent, or Firm*—Russell B. Miller; Linli L. Golden

[57] ABSTRACT

A packet switching architecture provides for a switch system comprised of a cellular base station in communication with the PSTN through a switch. Data packets are routed through the switch system as necessary to effect communication between the public switched telephone network (PSTN) and mobile radiotelephones disposed within the cellular coverage area surrounding the base station. A packet interconnection subsystem operates to transfer data packets between a plurality of interface ports, to which are coupled a corresponding plurality of signal lines. Within the interconnection subsystem, one or more distribution/consolidation (DISCO) interface units are mutually coupled together through a central router unit. Each DISCO interface unit is configured to consolidate the data packets received through at least two signal ports onto a consolidation bus, as well as to distribute the addressed data packets from a distribution bus to two or more of ports. In a preferred implementation, the interconnection subsystem is realized so as to efficiently provide redundancy among the interface units within the interconnection network.

15 Claims, 9 Drawing Sheets

METHOD AND APPARATUS FOR DISTRIBUTION/CONSOLIDATION (DISCO) INTERFACE UNITS FOR PACKET SWITCHED INTERCONNECTION SYSTEM

BACKGROUND OF THE INVENTION

I. Field of the Invention

The present invention relates generally to cellular communications systems, and, more particularly, to a packet switched cellular communications network incorporating a base station interconnection architecture within which redundancy among signal paths is efficiently maintained.

II. Description of the Related Art

Mobile cellular telephone service has been in use for some time, and traditionally has been characterized by a central site transmitting with high power to a limited number of mobile or portable units in a large geographic area. In early cellular systems only a limited number of radio channels were available, thus limiting the number of radiotelephone connections within an entire metropolitan area to the limited number of channels available. Through the use of advanced communications techniques, modern radiotelephone systems have a comparatively large number of radio channels thus increasing the total possible number of contemporaneous connections. Modern radio telephone systems may be cellular, personal communications, or wireless local loop systems.

Numerous standards exist for the implementation of modern radiotelephone communications. These standards include the advanced mobile phone system (AMPS), Global System for Mobile communication (GSM), and Code Division Multiple Access (CDMA). The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference.

In the just mentioned patent, a multiple access technique is disclosed where a large number of mobile telephone system users each having a transceiver communicate through satellite repeaters or terrestrial base stations using CDMA spread spectrum communication signals. By using CDMA communications, the same frequency spectrum can be reused multiple times. The use of CDMA results in a much higher spectral efficiency than can be achieved using other multiple access schemes. Moreover, techniques have been developed which further increase system capacity and otherwise enhance performance within CDMA systems. For example, in U.S. Pat. No. 5,103,459, issued Apr. 17, 1992, entitled "SYSTEM AND METHOD FOR GENERATING SIGNAL WAVEFORMS IN A CDMA CELLULAR TELEPHONE SYSTEM", also assigned to the assignee of the present invention, and which is herein incorporated by reference, there is disclosed a novel and improved method and system for constructing PN sequences that provide orthogonality between the users so that mutual interference is reduced. Because orthogonal PN codes have cross-correlation equal to zero over a predetermined time interval, no mutual interference arises between signals modulated with the orthogonal PN codes. Such a reduction in mutual interference allows for higher system capacity and better link performance.

FIG. 1 illustratively represents the configuration of a conventional CDMA radiotelephone system. The system includes a plurality of base stations transceiver subsystems, two of which are identified in FIG. 1 as base stations 101 and 102. Each base station may be partitioned into a number of sectors further increasing the total possible number of contemporaneous connections. Remote unit 108 may be a mobile, portable, personal communication, wireless local loop or similar unit capable of communication with base stations 101 and 102. Telephone calls are routed by base stations 101 and 102 between remote unit 108 and base station controller (BSC) 112, which is typically located within a mobile telephone switching office (not shown). The primary purpose of BSC 112 is to provide a connection between remote unit 108 and a land line within the public switched telephone network (PSTN). BSC 112 performs functions such as decompressing voice encoded call signals from remote unit 108 into a form that can be handled by the PSTN. BSC 112 also performs other tasks, including coordination of notification of a remote unit when a call is received from the PSTN.

Once a call has been established it occupies a signal path from the PSTN through the BSC to at least one base station. The signal path may change during the call if the call is handed off between base stations due to the movement of the remote unit within the system. If the system employs "hard" hand-offs, the remote unit communicates with only one base station at a time. After a hard hand-off another fixed path is established to carry the call. If the system employs so-called "soft" hand-offs, two or more paths are established during the hand-off process, thereby requiring multiple fixed paths to be maintained through a plurality of base stations until the soft hand-off is complete.

In the present system, system data is carried in packets and the equipment used is characterized as having a packet switch architecture. Given the packet switched nature of the fixed signal path through the BSC and a base station, fixed paths corresponding to a plurality of remote units share common equipment through the interconnection system. Therefore a failure of equipment in the interconnection system is likely to effect a plurality of established calls. In order to ensure that large groups of calls are not disconnected, or "dropped", upon failure of the interconnection system, it has been proposed that spare hardware be wired in parallel with each path. Unfortunately, such redundancy would undesirably lead to increased system cost and complexity.

Accordingly, it is an object of the present invention to provide a flexible interconnection system designed to maintain reliable communication between two or more units communicating using packets. It is a further object of the invention to provide redundancy within the interconnection system in a manner which does not require the provision of full duplication of communications hardware. It is yet a further object of the invention to provide a means of 'on-line' and 'off-line' testing of equipment within the interconnect system.

SUMMARY OF THE INVENTION

The interconnection network of the present invention uses a packet switching architecture to provide high speed communication between a plurality of units within a system. As used in the preferred embodiment, the packet switching architecture provides a switch system to facilitate communication between a public switched telephone network (PSTN) and a plurality of base stations.

A packet interconnection subsystem operates to transfer data packets between a plurality of interface ports, to which are coupled to a corresponding plurality of signal lines. The signal lines are used to carry data packets to and from a switch designed to interface with the PSTN, as well as to carry data packets to and from base station transceivers and other elements of the system. The architecture of the invention permits the interconnection subsystem of a first switch system to be coupled to the interconnect subsystems of other switch systems. This allows the mutually coupled interconnect subsystems to switch data packets between systems as needed to support "soft" hand-offs, during which the mobile radiotelephone is in communication with both switch systems before being handed off from one to the other.

In a preferred implementation of the interconnection subsystem, one or more distribution/consolidation (DISCO) units are mutually coupled together through a router unit therebetween. An alternate type of interconnection network may also be formed by connecting a pair of DISCO units in a "back-to-back" configuration or by using a single DISCO unit. Each DISCO unit is configured to consolidate the data packets received from at least two signal ports onto a consolidation bus. In addition, each DISCO unit functions to distribute data packets from a distribution bus to two or more of the internal interface ports in accordance with a destination address of each data packet. The router unit may be employed to couple the consolidation bus of each DISCO unit to the distribution bus of every other DISCO unit.

The present invention further contemplates an efficient architecture for providing redundancy among the interface units within each DISCO unit. In accordance with this aspect of the invention, a multiplexer network is used to parallel-connect corresponding distribution and consolidation paths of a first and a spare, or "roving", one of the interface units to a common set of signal ports. A finite state machine is disposed to equalize a first and second path within the first and roving interface units respectively in order that first and second identical sets of data packets received through a first of the signal ports are accumulated within the first and roving interface units. A comparison is made between the nominally identical sets of data packets and an error signal is generated when a difference exists therebetween. If the error signal is generated, the failing hardware can be taken off line and replaced. If no error is detected, a controller may then disable connection of the first interface to the first signal port and instruct the roving interface to begin operation as a substitute for the first unit. In a preferred embodiment if no error is detected, this process is repeated for each adjacent pair of interface units within the interconnection network. In this way the roving interface unit is continuously roving among all of the interface units included within the interconnection network, thereby obviating the need for a separate replacement to be provided for each interface unit. Moreover, the roving process allows the interconnection network to be off-line and on-line tested without interrupting the flow of data therethrough.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. Single-System Architecture

Figure 1:
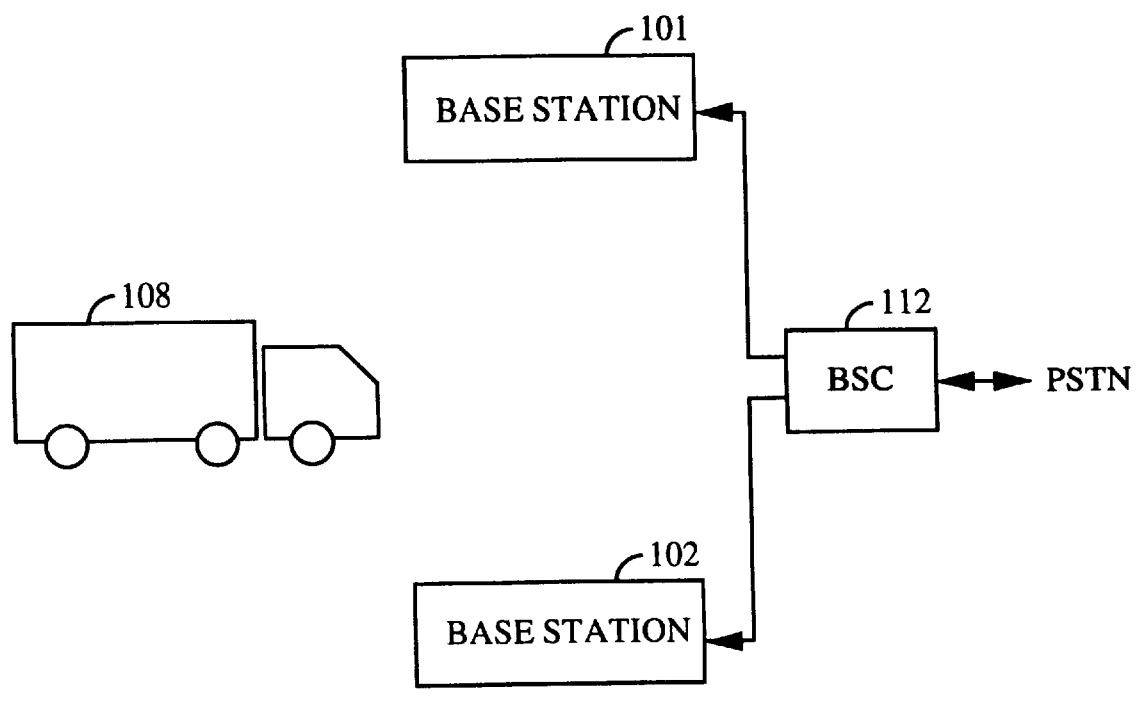
FIG. 1 illustratively represents the configuration of a conventional CDMA radiotelephone system.
Figure 2:
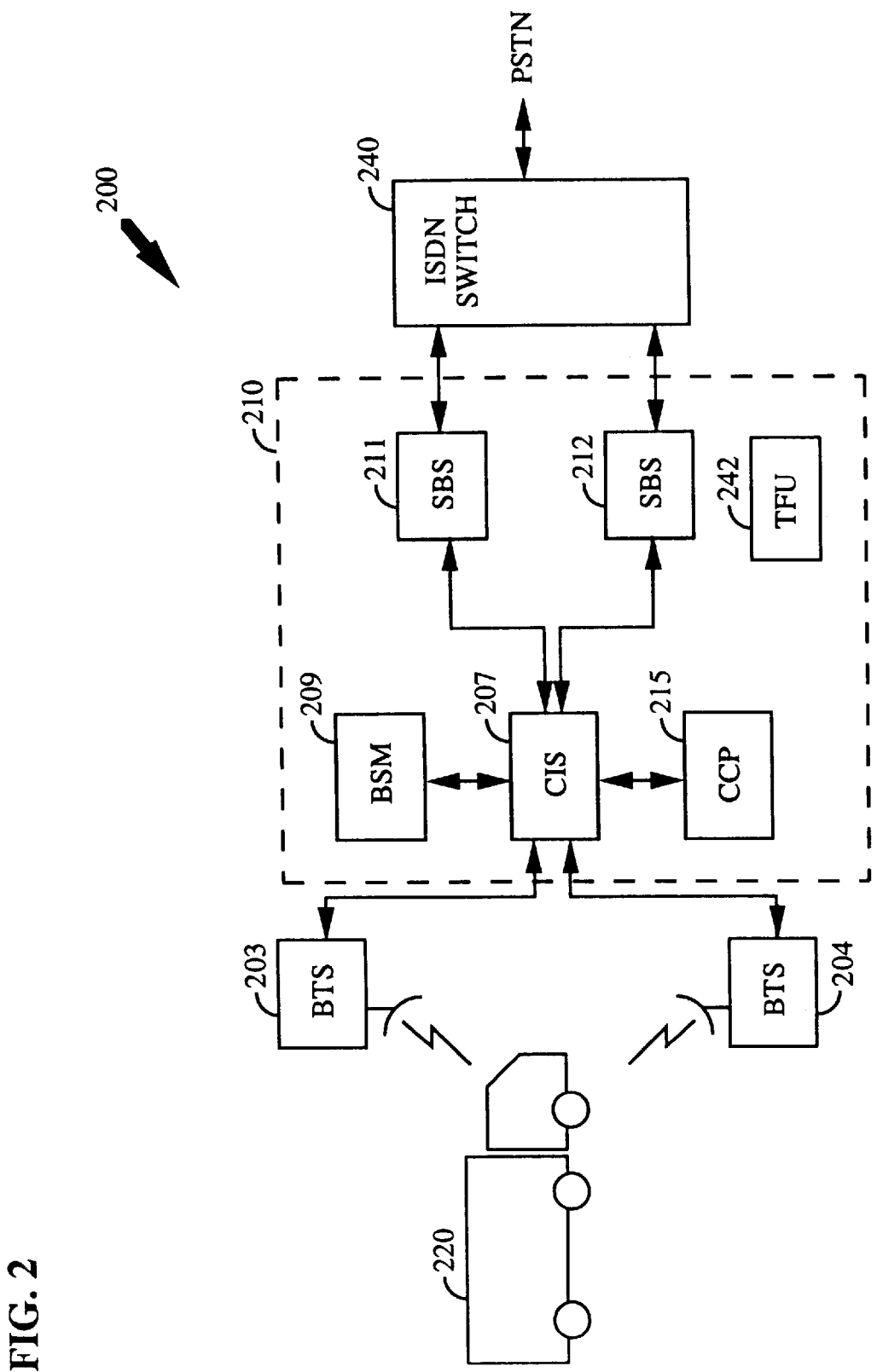
FIG. 2 illustrates the architecture of a single CDMA mobile radiotelephone packet-switch system in accordance with the invention.

FIG. 2 illustrates the architecture of a single CDMA wireless packet-switch system 200 in accordance with the invention. System 200 is comprised of a plurality of base station transceiver subsystems (BTS), which are represented in FIG. 2 as BTS 203 and BTS 204. Each base station transceiver subsystem 203 or 204, also referred to in the art as a cell site or base station, is comprised of modems, receivers, and transmitters. Base station transceiver subsystems 203 and 204 receive and transmit the signals that enable remote unit 220 to communicate with the public switched telephone network (PSTN). Each base station transceiver station 203 and 204 also contains a base station transceiver subsystem controller that manages the radio resources specific to that base station transceiver subsystem. In system 200, data packets are used in the wireless connection of information between base station transceiver subsystems 203 and 204 and remote unit 220.

From the land side, data packets are transferred to and from base station transceiver subsystems 203 and 204 by CDMA interconnect subsystem (CIS) 207, the operation of which is governed by base station manager (BSM) 209 and call control processor (CCP) 215. CIS 207 also exchanges data packets with a plurality of selector bank subsystems (SBS) 211 and 212, which are coupled to the public switched telephone network (PSTN) through ISDN switch 240. In the preferred embodiment, ISDN switch 240 comprises an Integrated Services Digital Network (ISDN) class 5 switch. ISDN switch 240 is operative to control: (i) the routing of data packets received from remote unit 220 to the proper portion of the PSTN, and (ii) the routing of signals from the PSTN to the appropriate selector bank subsystem 211 or 212. The use of this type of switch, rather than a mobile telephone switching office (MTSO), enables the system to exhibit wider channelization and higher user throughput.

Within the system of FIG. 2, a timing reference is provided by timing and frequency unit (TFU) 242. In a preferred implementation, TFU 242 receives timing information from a Global Positioning System (GPS) receiver (not shown).

System 200 illustrated in FIG. 2 typically covers a radio-telephone carrier's entire metropolitan area, using one ISDN switch 240 for a large number of base station transceiver subsystems. However, multiple switches may be used if the desired user throughput is too large for a single switch to handle. BSM 209, CIS 207, CCP 215, TFU 242 and SBSs 211 and 212 are collectively referred to as base station controller (BSC) 210.

When either BTSs 203 or 204 receives a signal comprised of data packets from remote unit 220, it routes the data packets to CDMA interconnect subsystem 207, which acts as a packet switch. CDMA interconnect subsystem 207 provides the connectivity between many of the subsystems within BSC 210 and BTSs 203 and 204, with other connectivity being conventionally provided (e.g., using EtherNet). In addition, CDMA interconnect subsystem 207 may also provide a communication gateway between the BSCs in other systems.

Selector bank subsystems 211 and 212 are comprised of a plurality of voice encoders/decoders (vocoders) that compress or decompress voice signals. A signal received from remote unit 220 on the reverse link is decoded within selector bank subsystem 211 or 212, while a signal from the PSTN to be transmitted to remote unit 220 on the forward link is encoded within selector bank subsystem 211 or 212. The vocoding operation performed in selector bank subsystems 211 and 212 may comprise, for example, the variable rate code excited linear prediction (CELP) vocoding algorithm detailed in U.S. Pat. No. 5,414,796 entitled "VARIABLE RATE VOCODER" issued May 9, 1995, and assigned to the assignee of the present invention.

Selector bank subsystems 211 and 212 may also comprise data modems for conversion of encoded signals from remote unit 220 on the forward link to standard modem tones for the PSTN and for conversion of standard modem tones from the PSTN to packetized data for transmission to remote unit 220 on the reverse link. Further information on a data connection within a wireless system can be found in co-pending U.S. Pat. No. 5,479,475 entitled "METHOD AND APPARATUS OF PROVIDING COMMUNICATION BETWEEN STANDARD TERMINAL EQUIPMENT USING A REMOTE COMMUNICATION UNIT" filed Nov. 15, 1993 and assigned to the assignee of the present invention.

Call control processor 215 is responsible for overall control of call setup and teardown between both remote units and PSTN originations. CCP 215 also manages remote unit mobility such as registration. CCP 215 allocates the resources within BSC 210 such as SBS allocation based on the service option selected. CCP 215 also tracks and records all call activities such as for billing purposes.

Base station manager 209 performs the functions of configuration management, fault management, performance management and security management. For example, BSM 209 provides a means to configure the network elements including adding and deleting new elements. BSM 209 sets operation parameters and allows viewing a status of registers on the various elements. Fault management includes determining when and where a fault has occurred and performing fault response procedures.

II. Dual-System Architecture

Figure 3:
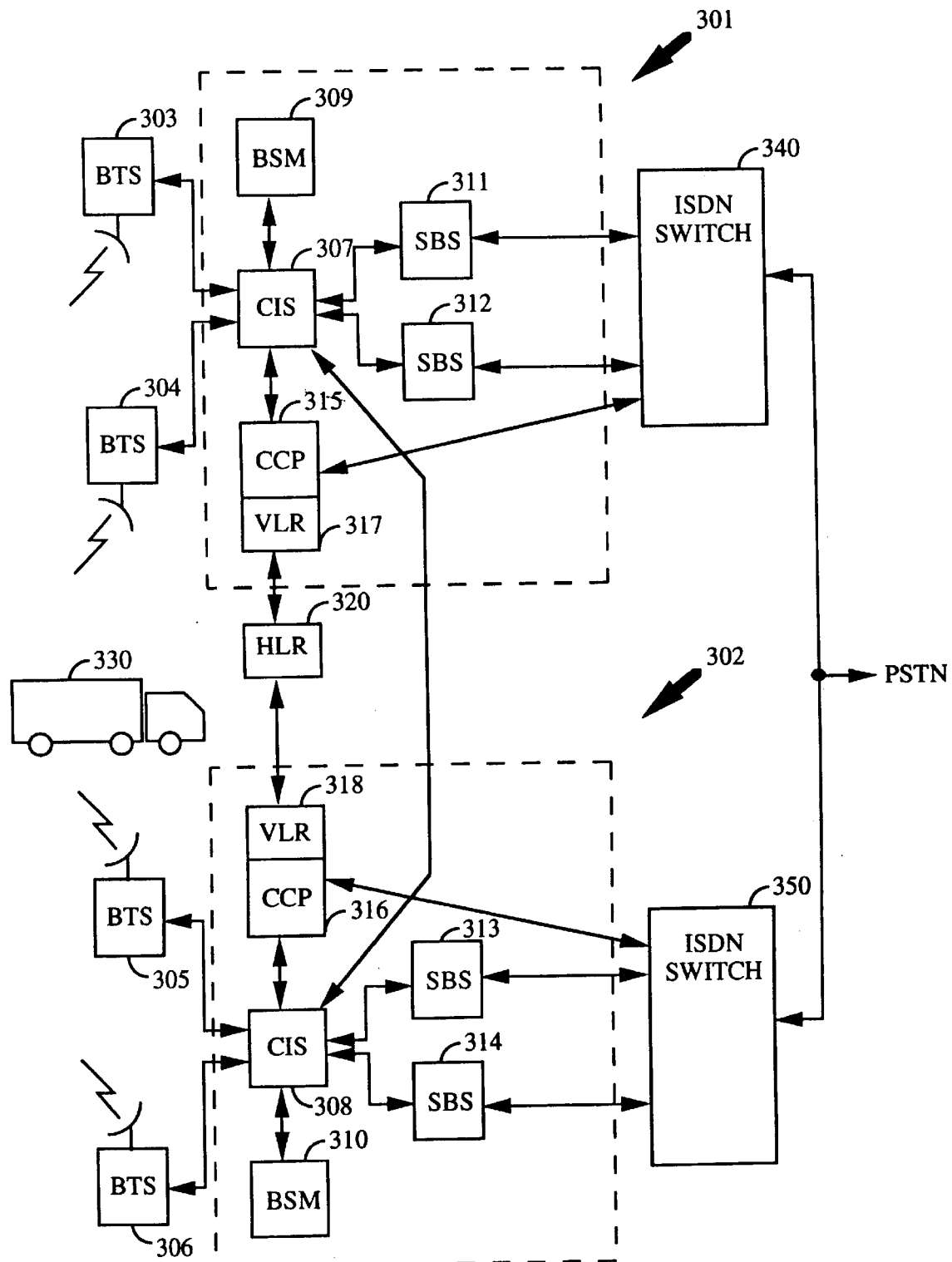
FIG. 3 illustrates a preferred implementation of the packet-switch architecture of the invention within a dual system.

FIG. 3 illustrates a preferred implementation of the packet-switch architecture of the invention within two packet-switch systems. Although networks with three or more switch systems are also within the scope of the present invention, for clarity the discussion accompanying FIG. 3 relates to only two packet-switch systems 301 and 302. Also although the architecture of the preferred embodiment of the present invention is illustrated in a CDMA-type system, in alternative embodiments other communication systems, such as the Global System for Mobile communications (GSM), may be used. Systems 301 and 302 may be operated by two different cellular radiotelephone carriers, or may be controlled by a single carrier using two switches for interfacing with the PSTN.

Systems 301 and 302 shown are comprised of numerous base station transceiver subsystems 303–306 for communicating with remote unit 330. Base station transceiver subsystems 303, 304 and 305, 306 are coupled to their respective CDMA interconnect subsystems 307 and 308, which are in turn coupled to corresponding base station managers 309 and 310 and call control processors 315 and 316. Each system 301 and 302 also includes numerous selector bank subsystems 311, 312 and 313, 314 coupled to the CDMA interconnect subsystem 307 and 308 respectively. Selector bank subsystems 311, 312 and 313, 314 are coupled to respective ISDN switches 340 and 350. ISDN switches 340 and 350 of each system are coupled to the PSTN.

Each system's call control processor 315 and 316 is coupled to a visitor location register (VLR) 317 and 318. Each visitor location register 317 and 318 comprises a database which includes information pertaining to remote users presently roaming within the coverage area of either one of systems 301 or 302. The information within VLRs 317 and 318 specifies "feature preferences" of each user, such as call forwarding and conference calling, and may also specify information specific to a CDMA cellular system. In the preferred embodiment, VLRs 317 and 318 constitute distinct entities within their respective systems 301 and 302. However, in alternative embodiments the visitor location register maybe incorporated within ISDN switches 340 and 350.

In FIG. 3, VLRs 317 and 318 are coupled to a home location register (HLR) 320. HLR 320 is a database of information relating to remote users considered to be nominally resident within, or "at home", within the coverage areas of systems 301 and 302 of FIG. 3. HLR 320 may include information specifying the current location and class of service for those users "at home" within systems 301 and 302. In the preferred embodiment of FIG. 3, HLR 320 is seen to be coupled between VLR 317 and VLR 318. Alternately, the home location register may be incorporated within ISDN switches 340 and 350.

As is indicated by FIG. 3, CDMA interconnect subsystem 307 of system 301 is coupled to CDMA interconnect subsystem 308 of system 302. This allows CDMA interconnect subsystem 307 to share information with, and switch data packets to, CDMA interconnect subsystem 308. As will be evident later, this mutual coupling between interconnect subsystems allows the packet-switch architecture of the invention to provide versatile call-handling capability and otherwise improved performance.

III. Call Set-Up and Packet Routing Operations

Within the mobile radio communications network of the present invention, calls are initiated, or "set-up" either from the PSTN to a remote unit (forward link), or from a remote unit to the PSTN (reverse link). Calls set-up on the reverse link may further include those between remote units. Call set-up on the reverse link will be initially described with reference to FIG. 3.

When remote unit 330 initiates a call, receiving base station transceiver subsystem 305 notifies CCP 316. CCP 316 authenticates the call and determines whether processing should continue. If the call is properly authenticated, CCP notifies ISDN switch 350 to allocate a PSTN line. CCP 316 sends a message to SBS 313 to allocate a selector element. CCP 316 sends a message to the allocated selector element within SBS 313 to establish a radio link with remote unit 330. The allocated selector element requests a traffic channel assignment from base station transceiver subsystem 305 based on the call resource manager therein. The allocated selector element notifies CCP 316 of the traffic channel allocated. CCP 316 sends a channel assignment message to remote unit 330 via base station transceiver subsystem 305. When the link is completed, the allocated channel element notifies CCP 316 of the successful link completion. All communications now take place between remote unit 330 and selector bank subsystem 313 through CDMA interconnect subsystem 308. Once the call has been set-up, base station transceiver subsystem 305 inserts the address of the allocated selector element into the address field of data packets received from remote unit 330 prior to forwarding the packets to CDMA interconnect subsystem 308. CDMA interconnect subsystem 308 then transfers the received packets to the allocated selector element based on the appended address. The process of packet transfer through CDMA interconnect subsystem 308 is described in further detail in a later section.

Calls are set-up on the forward link using a similar procedure. After the PSTN has informed ISDN switch 350 that a call has been received, ISDN switch 350 notifies call control processor 316. CCP 316 determines a paging zone by accessing VLR 318 which tracks the last known location of each remote unit in the system. CCP 316 forwards the page message to the set of base station transceiver subsystems which maybe within communication range of remote unit 330 based on the information from VLR 318. In turn, each base station transceiver subsystem to which the page message is provided issues a page intended for remote unit 330.

Remote unit 330 responds to an issued page by sending a page response message over an access channel. Assuming that remote unit 330 is within communication range of base station transceiver subsystem 305, base station transceiver subsystem 305 receives the page response message. Base station transceiver subsystem 305 sends an indication to CCP 316 indicating reception of the page response from remote unit 330. CCP 316 sends a message to SBS 313 to allocate a selector element. CCP 316 sends a message to the allocated selector element within SBS 313 to establish a radio link with remote unit 330. The allocated selector element requests a traffic channel assignment from base station transceiver subsystem 305 based on the call resource manager therein. The allocated selector element notifies CCP 316 of the traffic channel allocated. CCP 316 sends a channel assignment message to remote unit 330 via base station transceiver subsystem 305. When the link is completed, the allocated channel element notifies CCP 316 of the successful link completion.

Once the call has been established, it may become necessary to "hand-off" the call to the another base station transceiver subsystem which may be associated with system 302 or another system such as system 301. An exemplary hand-off process contemplated by the invention will now be described with reference to FIG. 3.

The hand-off process is facilitated by configuring each of the base station transceiver subsystems 303–306 to continuously transmit a distinguishable pilot signal. Remote unit 330 receives and analyses the distinguishable transmitted pilot signal for each base station transceiver subsystem within communication range of remote unit 330. Remote unit 330 transmits a pilot quality measurement report to the base station transceiver subsystems with which it is communicating indicating the quality of the pilot signal as received by remote unit 330. In the preferred embodiment, the quality threshold corresponds to an acceptable bit error rate of the received signal. It is to be understood that in alternate embodiments various other parameters may be evaluated in order to determine signal quality.

Referring again to FIG. 3, assume remote unit 330 is in communication with base station transceiver subsystem 305 and is approaching base station transceiver subsystem 304 with which remote unit 330 is not currently in communication. Once the pilot quality measurement report corresponding to base station transceiver subsystem 304 exceeds a predetermined quality threshold, selector bank subsystem 313 handling the call instructs remote unit 330 through base station transceiver subsystem 305 to add base station transceiver subsystem 304 to remote unit's 330 list of "active" base stations. Next, selector bank subsystem 313 instructs base station transceiver subsystem 304 to begin reception of signals from remote unit 330, as well as to assign traffic channel resources to remote unit 330.

While communication is established between remote unit 330 and base station transceiver subsystem 304 and 305, data packets from remote unit 330 from both system 301 and system 302 may be routed to selector bank subsystem 313 handling the call. By using the communication signal from each system 301 and 302 on a packet-by-packet basis, selector bank subsystem 313 can provide a high quality communication signal. Likewise selector bank subsystem 313 routes a copy of each data packet to be transmitted to remote unit 330 to both system 301 and system 302. Remote unit 330 may combine the packets received from both base station transceiver subsystems 304 and 305 to produce a high quality signal.

If remote unit 330 moves away from base station transceiver subsystem 305 of system 302, the quality of signals exchanged between remote unit 330 and system 302 begins to degrade. After the signal quality falls below a predefined quality threshold (e.g., bit error rate exceeds a usable threshold), selector bank subsystem 313 issues a command which instructs remote unit 330 to remove base station transceiver subsystem 305 from its list of active base stations. Selector bank subsystem 313 also instructs base station transceiver subsystem 305 to release the traffic channel assigned to remote unit 330. Remote unit 330 remains in communication with selector base subsystem 313, by way of system 301 and base station transceiver subsystem 304, over a signal path provided by the mutually coupled CDMA interconnect subsystems 307 and 308.

What should be evident by examination of FIG. 3 and the processes described above is that a large number of discrete and distant entities need to communicate packets between one another in an efficient and reliable manner in order for the system to work. The communication hub is the CIS. Even a minor or intermittent failure of circuitry within the CIS could disrupt communication of the entire system and cause disruption or disconnection of a large number of calls in progress. Therefore, the ability to reliably on-line and off-line test the circuitry within the CIS to detect errors and the ability to provide redundancy within the CIS circuitry are important to the reliability of the entire system.

IV. Overview of Packet Interconnection Subsystems

Figure 4:
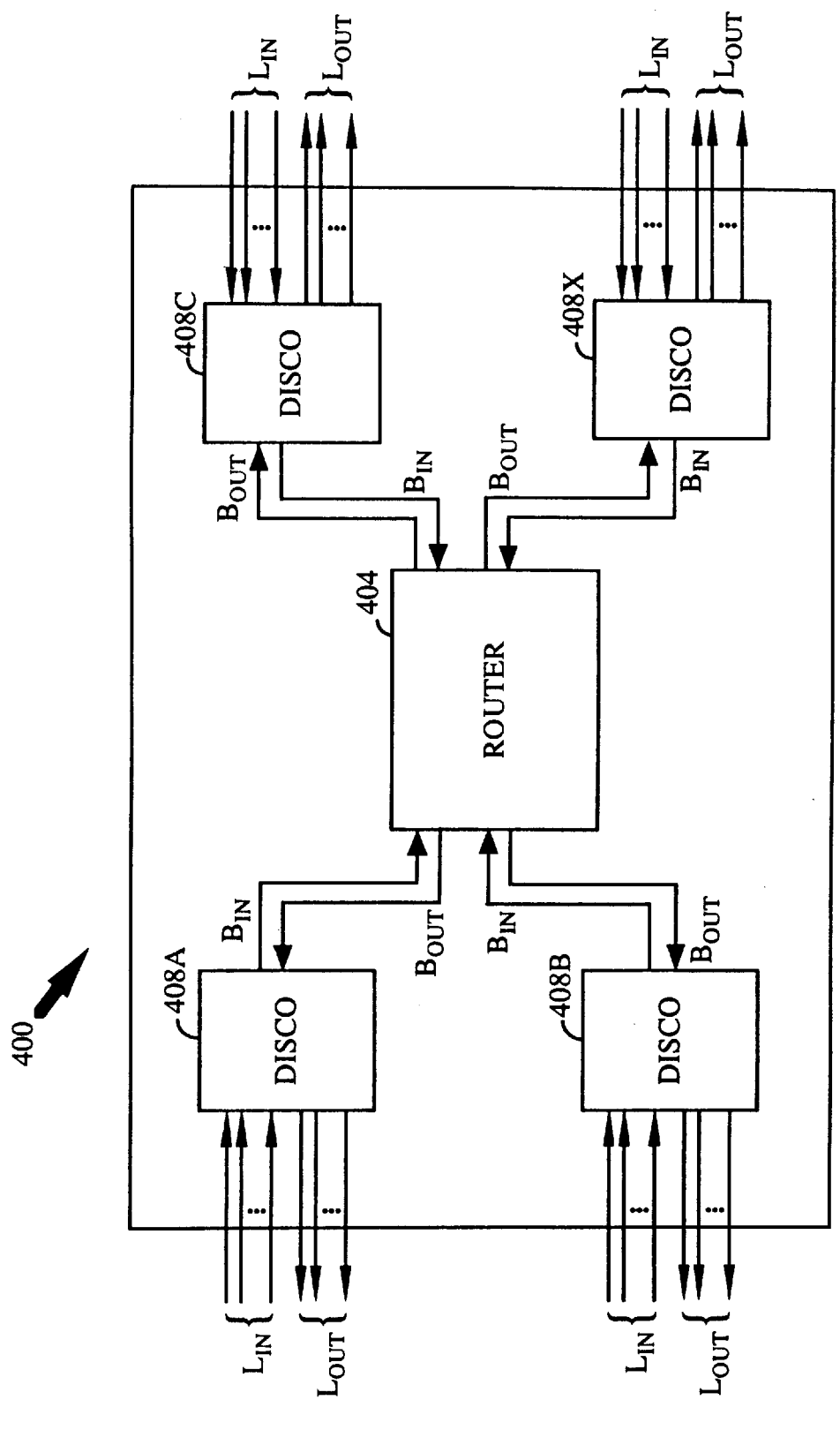
FIG. 4 shows a block diagram of an exemplary CDMA interconnection subsystem of the type included within the system of FIG. 3.

Turning now to FIG. 4, there is shown a block diagram of an exemplary CDMA interconnection subsystem 400 of the type included within the system of FIG. 3. CIS 400 may include router 404 and one or more distribution/consolidation (DISCO) interface units 408A–408X, each of which are hereinafter referred to simply as a "DISCO". Each DISCO 408A–408X includes a plurality of interface cards, with each card being bifurcated into consolidation and distribution sections. The consolidation section functions to consolidate the packet data received from a plurality of lower-rate signal lines ($L_{IN}$) to a high-speed data bus ($B_{IN}$). The packet data from the high-speed data bus ($B_{OUT}$) is distributed to a plurality of lower-rate signal lines ($L_{OUT}$). In the preferred embodiment, the lower-rate data lines $L_{IN}$ and $L_{OUT}$ are Medium Speed Serial Links which carry variable length packets with High Level Data Link Communication (HDLC) protocol. In the preferred embodiment, the high-speed data buses $B_{IN}$ and $B_{OUT}$ are 155.52 Mbps SONET OC-3 lines carrying fixed length ATM packets.

CIS 400 routes a packet from its source to its destination. For example, consider the case where BTS 305 sends a packet of data comprising encoded voice to SBS 313. A channel element within BTS 305 corresponding to the telephone call creates a packet of encoded voice information and attaches to it an address corresponding to the destination selector element within SBS 313. The packet is sent to CIS 400 on a lower-rate data line connected to BTS 305. DISCO 408A of FIG. 4 consolidates the packet with other packets on the lower-rate data line with the data from other lower-rate data lines into a single high-speed data bus, $B_{IN}$. Router 404 interconnects multiple high-speed data buses, $B_{IN}$ and $B_{OUT}$. Each high-rate data bus is fully connected to each other bus. In this case, router 404 connects the packet from DISCO 408A associated with BTS 305 to DISCO 408C associated with SBS 313. DISCO 408C filters the data for SBS 313 from the high-speed data bus $B_{OUT}$ on to the lower-rate data line $L_{OUT}$ connected to SBS 313 based on the destination address. Other entities in the system such as BSM 310 of system 302 or BTS 304 of system 301 may send information to the same selector element simply by using the selector element's addresses in a like manner. Likewise an element with BTS 305 may send a message to another entity connected to DISCO 408A. In this case the data 'U-turns' within DISCO 408A without being transferred through router 404.

Note that in a system which contains a limited number of lower-rate data lines, it is possible to implement the CIS function without the use of router 404. Thus if a single DISCO can provide a lower-rate data line for each element of the system, the CIS can be implemented with a single DISCO in which all incoming DIS and CO packets 'U-turn' respectively to the CO and DIS paths within the single DISCO. Also in a system in which a pair of DISCOs provide sufficient communication capabilities for the system, the pair of DISCOs can be connected back-to-back by interconnecting high-speed data buses $B_{IN}$ of the first DISCO to $B_{OUT}$ of the second DISCO and $B_{OUT}$ of the first DISCO to $B_{IN}$ of the second DISCO.

Figure 5A:
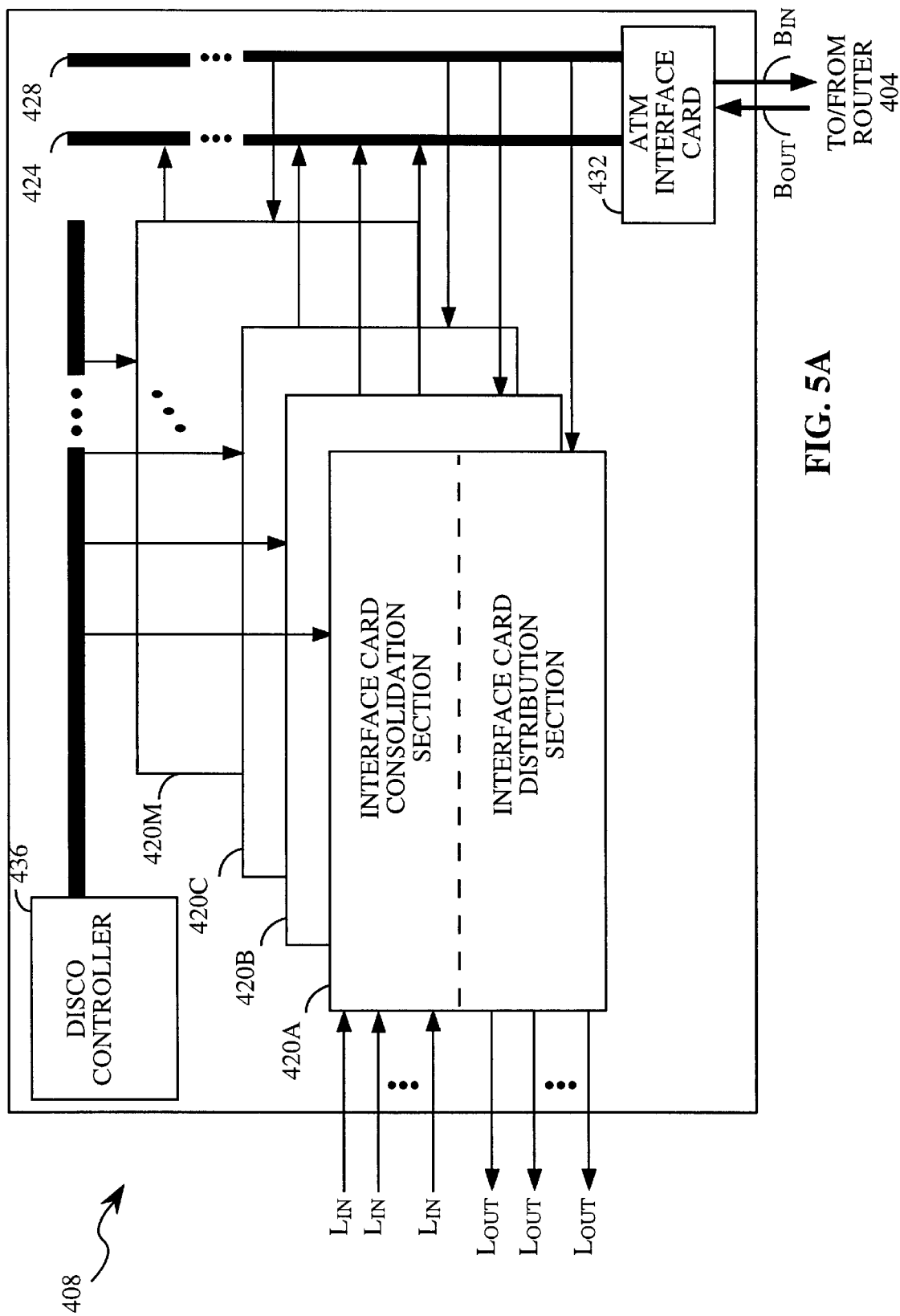
FIG. 5A depicts an exemplary implementation of a packet distribution/consolidation (DISCO) unit in which is included a set of thirteen interface cards.

Turning now to FIG. 5A, in an exemplary embodiment each DISCO 408A–408X includes, in the preferred embodiment, a set of thirteen interface cards 420A–420M, each of which includes distribution and consolidation sections. Specifically, the consolidation section of each interface cards 420A–420M multiplexes onto DISCO consolidation bus 424 the data packets received from a set of input lower-rate data lines $L_{IN}$. In the distribution section, the packet data carried by DISCO distribution bus 428 is allocated to a set of lower-rate data lines $L_{OUT}$. In the exemplary embodiment, the lower-rate signal lines $L_{IN}$ and $L_{OUT}$ carry data packets, at not necessarily equivalent serial data rates of up to 10 megabits per second (Mbps), between each DISCO 408A–408X and various base station subsystems. The consolidation sections of interface cards within each DISCO 408A–408X convert the up to 10 Mbps serial data into 8-bit parallel streams of the preferred embodiment. The data from the consolidation section of each interface cards 420A–420M corresponding to each lower-rate data line $L_{IN}$ is then multiplexed onto DISCO consolidation bus 424, operative in the preferred embodiment at 19.44 Mega-Bytes per second (MBps), in a quasi round-robin fashion described below. A primary asynchronous transfer mode (ATM) interface card 432 within each DISCO 408A–408X converts the data from the 19.44 MBps consolidation bus into a 155.52 Mbps serial stream which is provided to high-speed data buses $B_{IN}$. Each DISCO 408A–408X generally includes both the primary ATM interface card 432 and also a redundant ATM card (not shown).

A converse set of operations are performed during transfer of data packets from router 404 to the lower-rate signal lines $L_{OUT}$. Specifically, data packets are provided by a 155.52 Mbps high-speed serial data bus $B_{OUT}$ to DISCO 408. ATM interface card 432 converts the received 155.52 Mbps serial stream to a 19.44 MBps parallel stream carried by DISCO distribution bus 428. Data packets on DISCO distribution bus 428 are routed, based on destination address, to the signal lines $L_{OUT}$ through address-gated distribution buffers within the distribution section of the appropriate interface cards 420A–420M within DISCO 408. Further details relating to the consolidation and distribution of data packets within each DISCO are provided in the following sections.

V. Testing of the Packet Interconnection Subsystem

During operation, twelve of the thirteen interface cards 420A–420M within DISCO 408 therein are active, or "on-line", at any given time. The remaining interface card of interface card 420A–420M which is not active is designated the roving test interface card (RTIC). Each interface card 420A–420M is capable of being either an on-line card or a RTIC. During operation, the designated RTIC is "roved" among interface cards 420A–420M. The designated RTIC may be connected in parallel with one of the on-line interface cards. The RTIC may be configured like the interface card with which it is connected in parallel. The RTIC may then be equalized thereto such that both cards receive, process, and provide an identical sequence of data. In such an on-line test configuration, the on-line interface card is referred to as the master card and the RTIC is referred to as the slave card. Prior to being connected in the master/slave configuration, the RTIC may be independently off-line tested to ensure it is operating correctly.

During on-line test, the master and slave cards are first connected in parallel to a set of consolidation ports and the consolidation paths of the both cards are evaluated. Next, the same master and slave cards are connected to the corresponding set distribution ports and the distribution paths of the both cards are evaluated. The data output by the master and slave cards should be the same and may be compared to determine whether both cards are functioning properly.

The comparison of the slave and master card may take on a variety of forms. The storage unit contents within the master and the slave may be compared on a bit by bit basis. Or a subset of the storage unit contents within the two sections may be compared on a random or preselected pattern basis. The output of the master and slave can be compared at one of several points in each section. In the preferred embodiment the comparison is made by calculating a checksum based on data output by the master and slave output packet buffers as described below. The creation of the checksum can be accomplished any of a large variety of manners well known in the art.

If both the master and the slave cards produce the same data indicating that the master and the slave are operating properly, the slave RTIC card can become the on-line card servicing the port previously being serviced by the master interface card. The transition between the two is facilitated because the two cards have already been equalized and are receiving, processing, and producing the same data. When the RTIC slave card becomes the on-line card, the original master on-line card is now off-line. It is now designated the RTIC card and is available for self test or may become the slave card in an on-line test a third interface card. This process is referred to as the roving process and may be carried out until each interface cards 420A–420M has functioned as master and slave, which ensures that each card tested is operating properly.

If discrepancy is detected between the data packets produced by the pair of master and slave interface cards, various remedial measures may be taken. For example, the slave interface card may be reset and again tested against the master. The slave may be subjected to a full independent self-test. A service request message may be sent to the base station controller or a manned station such that further investigation is requested.

Note that if no discrepancy is detected, servicing of the corresponding data line may be transitioned smoothly from the on-line master to the off-line slave at any appropriate time because of the equalization. But if the on-line test fails due to discrepancies, a switch to the off-line slave may produce different data than would be produced by the currently on-line master. In such a case, the off-line slave may be "slammed" on-line but a resulting loss of data may occur.

Note that full equalization is not required for roving to occur. If it is desired to rove the designated RTIC to a new position, the on-line card need only signal to the off-line RTIC to begin to receive data from the input line. The on-line card retains control of the output port until it has emptied any residually stored data packets while no longer accruing any more data from the input port. When the on-line card has emptied its stored content, control of the output port may be transitioned to the RTIC card which may begin to output any stored data packets it has accumulated.

The roving process is seen to obviate the need for a separate back-up interface card to be hardwired in parallel with each on-line interface card. Because a set of N+1 interface cards is provided to transfer data through N sets of ports such that each of the N sets of ports is capable of being serviced by two interface cards, a failing card can be permanently designated the RTIC while the remaining 12 cards service all incoming ports. (In the preferred embodiment, the N sets of ports are comprised of six signal lines.) Because the RTIC can be transitioned into active service upon detection of a fault within a given one of the N on-line cards, it is unnecessary to deploy a complete set of N back-up cards for the N on-line cards. In this way complete redundancy is established by using a total of only N+1 interface cards which is a significant improvement in flexibly, size, cost, and power consumption over providing a separate redundant card for each of the N on-line cards.

Figure 5B:
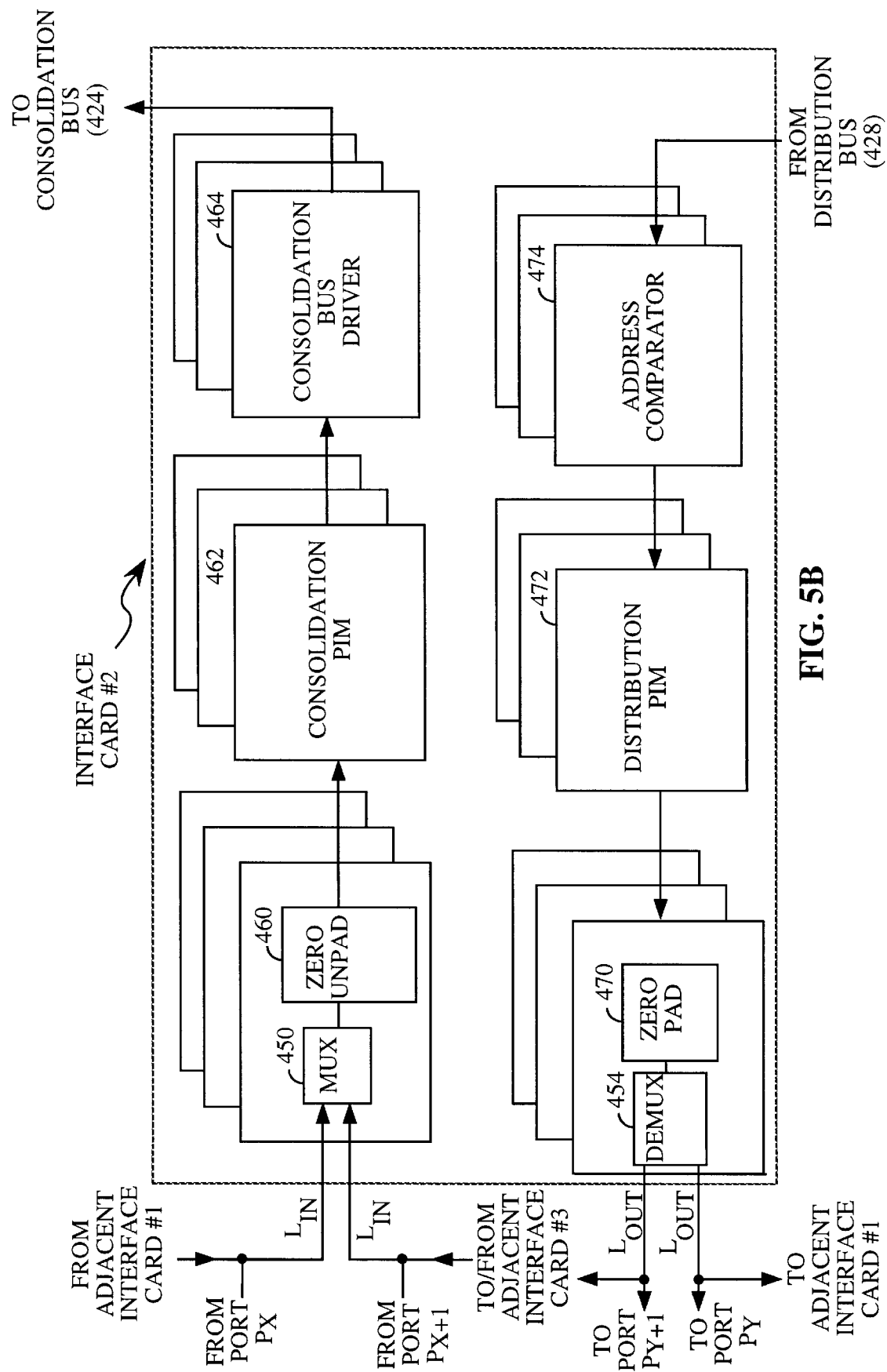
FIG. 5B is a block diagram of the consolidation and distribution sections comprising a single interface card.

Referring now to FIG. 5B, a block diagram is shown of the consolidation and distribution sections of interface card 420B, which for illustrative purposes may be considered to be adjacent to interface card 420A and interface card 420C as shown in FIG. 5A. In the preferred embodiment, six signal paths are defined within the consolidation section of interface card 420B and six signal paths are defined within the distribution section of interface card 420B. In other words, interface card 420B is configured to accept inputs through six input ports via six input lines $L_{IN}$, and to provide outputs through six output ports to six output lines $L_{OUT}$. As was described previously, during the on-line test contemplated by the present invention two interface cards serve as a master and as a slave respectively. When interface card 420B is functioning as a master and interface card 420A is functioning as a slave, each signal path within the distribution and consolidation sections of interface card 420B is sequentially connected in parallel with the corresponding paths of interface card 420A.

A given consolidation/distribution path may be connected in parallel with a consolidation/distribution path on an adjacent card by coupling each path to the same input (i.e., to the same signal line $L_{IN}$ or same address set from distribution bus 428.) In FIG. 5B, multiplexer 450 allows a first consolidation path of interface card 420B to be alternately connected to input ports $P_x$ or $P_{x+1}$. That is, when the distribution/consolidation paths of interface card 420B are to be connected in parallel with interface card 420A, multiplexer 450 forms a connection to port $P_x$. When interface card 420B is to be connected in parallel with interface card 420C, multiplexer 450 selects the signal line $L_{IN}$ from input port $P_{x+1}$.

Similarly, demultiplexer 454 functions to alternately couple one of the distribution paths of interface card 420B to either output port $P_y$ or output port $P_{y+1}$. When interface card 420B relieves interface card 420A (not shown) from on-line operation, demultiplexer 454 selects output port $P_y$, and when interface card 420B relieves interface card 420C from on-line duty, demultiplexer 454 selects output port $P_{y+1}$.

As mentioned above, in the preferred embodiment, each interface card of interface cards 420A–420M supports six distribution paths and six consolidation paths. In FIG. 5B, the consolidation path which includes multiplexer 450 is seen to further comprise zero unpad network 460, consolidation packet interface module (PIM) 462, and consolidation bus driver 464. Likewise, the distribution path which includes demultiplexer 454 is seen to further include zero pad network 470, distribution PIM 472, and address comparator 474. Each of the other five distribution paths and consolidation paths are configured substantially identically to the consolidation path and distribution path shown in FIG. 5B.

In an exemplary embodiment, the zero-padding operation performed by zero pad network 470 comprises inserting a zero following every sequence of five consecutive logical 1's received from distribution PIM 472. This zero-padding prevents extended strings of logical 1's from being mistaken as a flag elsewhere in the system. In the consolidation direction, any zeroes previously inserted into the data are removed by the zero-unpad network 460. The resultant "zero-unpadded" serial data is converted into an 8-bit parallel data stream, which is provided to consolidation PIM 462. Consolidation PIM 462 includes a first-in-first-out (FIFO) buffer which stores the variable length packets.

The packets are transmitted by the various interface cards 420A–420M in a round-robin scheme and multiplexed on the 19.44 MHz 8-bit DISCO consolidation bus 424 to ATM interface card 432. The round-robin scheme is controlled by a set of arbiters. Each output packet buffer which has a packet to place on DISCO consolidation bus 424 flags a local card arbiter (not shown). The card arbiter signals a DISCO arbiter which in turn signals a CIS arbiter. The CIS arbiter sequentially sends an enable signal to each DISCO having output ready for the bus. Each DISCO arbiter in turn sequentially sends an enable signal to one of the cards having an output ready for the bus. In turn the enabled card arbiter sends an enable signal to one of the consolidation bus driver to transmit its queued output on the consolidation bus and the parallel data from consolidation PIM 462 is passed to the consolidation bus 424 by way of consolidation bus driver 464. In this manner each consolidation path is granted access to the consolidation path in a quasi round-robin fashion. Further details relating to the structure and operation of consolidation and distribution PIMs 462 and 472 are provided below with reference to FIGS. 6 and 8.

In the distribution process of data packets from distribution bus 428 to the output signal lines $L_{OUT}$, address comparator 474 of each distribution path is programmed to select only data packets having an address within a certain set of values. For example, address comparator 474 is programmed to accept only data packets having addresses included in a list of acceptable 24-bit addresses. If a data packet having an address outside the list of acceptable 24-bit addresses is present on distribution bus 428, address comparator 474 ignores the packet and waits for the arrival of the next packet. If a data packet having an address within the list of acceptable 24-bit addresses is present on distribution bus 428, the 8-bit parallel data from address comparator 474 is clocked into the FIFO buffer within distribution PIM 472 at the exemplary rate of 19.44 MHz. The 8-bit parallel data is then clocked out of the FIFO buffer within the distribution PIM 472 at an exemplary rate of 1.215 MHz, and provided to the zero pad network 470.

As was mentioned above during on-line testing, each interface card of interface cards 420A–420M is alternately connected in parallel with each physically adjacent neighboring interface card. That is, each consolidation path of a given card is connected to the same input line $L_{IN}$ as a corresponding consolidation path on a neighboring card, and each distribution path on the given card is configured to receive the same information through from the distribution bus 428 as the neighboring card. In accordance with the present invention, the corresponding consolidation path or distribution path under test of the two interface cards are then "equalized" so that the consolidation or distribution PIM FIFO of each card include precisely the same set of data packets. Following equalization, the packet data can be compared in order to determine if the consolidation paths of each card are processing data in the same way. Disagreement between the data latched at the outputs of corresponding consolidation or distribution PIMs indicates an error in processing has occurred.

Figure 6:
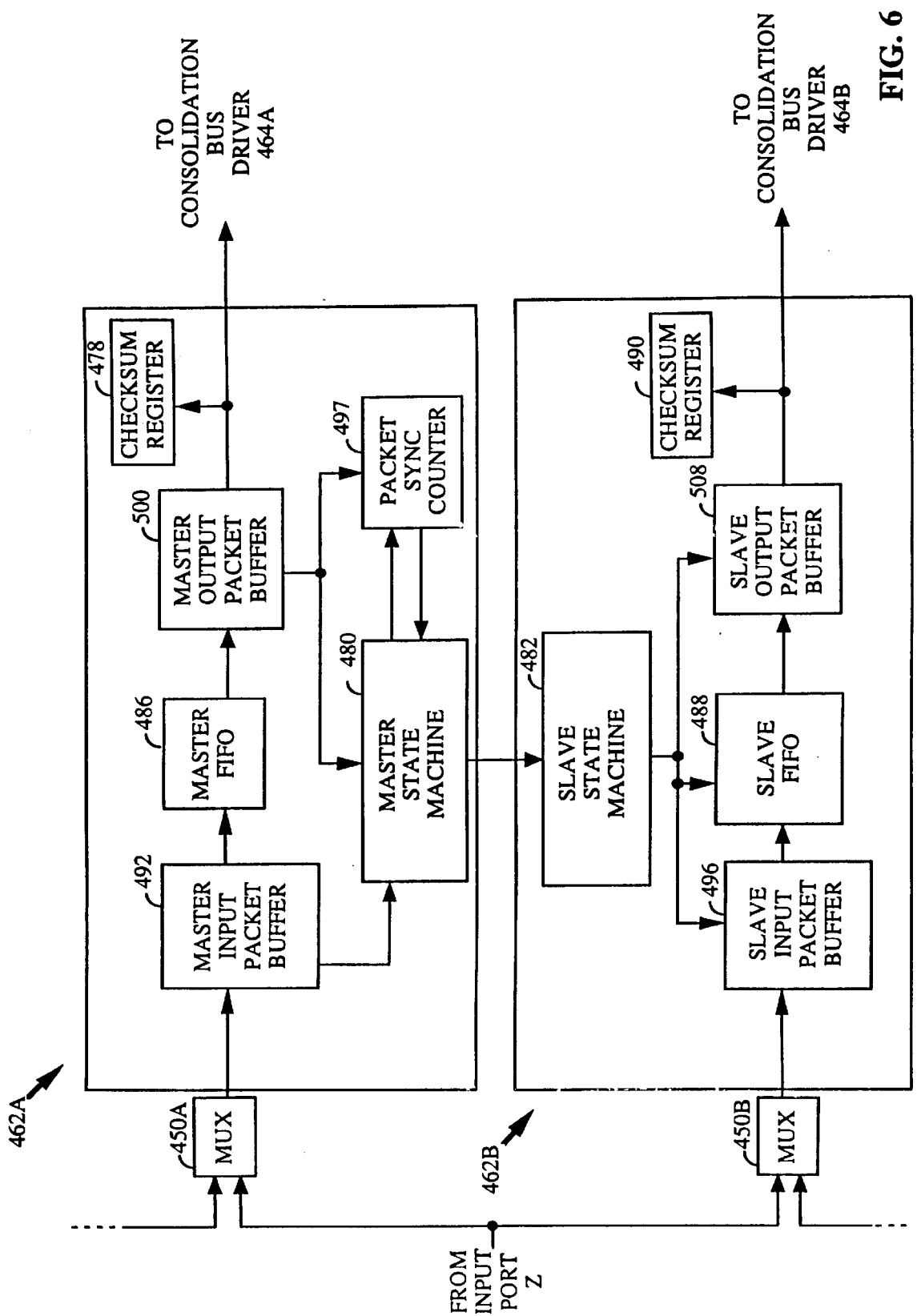
FIG. 6 provides a detailed view of a consolidation packet interface module (PIM) of a master interface card connected in parallel to a consolidation PIM of a slave interface card.

Referring now to FIG. 6, the process of equalizing the consolidation PIMs within corresponding, parallel-connected consolidation paths disposed upon adjacent master and slave interface cards will now be described. In FIG. 6, consolidation PIM 462A is associated with the master interface card and consolidation PIM 462B is associated with the slave interface card currently designated as the RTIC. For purposes of clarity, zero unpad network 460 is not shown coupled to either consolidation PIM 462A or consolidation PIM 462B. Again, during the roving test procedure the master interface card is assumed to be "on-line" and normally processing data. That is, consolidation bus driver 464A of the master interface card receives parallel data in the usual way from master consolidation PIM 462A, and provides this data to consolidation bus 424 (see FIG. 5B). In addition, the data checksum latched within checksum register 478 at the output of consolidation PIM 462A is also provided to DISCO unit controller 436 (see FIG. 5A) for comparison with the corresponding data checksum latched within checksum register 490 at the output of the consolidation PIM 462B. However, consolidation bus driver 464B corresponding to consolidation PIM 462B is disabled.

DISCO controller 436 initiates on-line testing by setting multiplexers 450A and 450B to connect master and slave consolidation PIMs 462A and 462B to receive data from the same input port (port Z). DISCO controller 436 then configures master state machine 480 within the master consolidation PIM 462A to operate as a master state machine and configures slave state machine 482 within slave consolidation PIM 462B to operate as a slave state machine. Upon being configured, master state machine 480 initiates a FIFO equalization routine designed to cause identical sets of data packets to be stored within master FIFO 486 and slave FIFO 488.

Figure 7A:
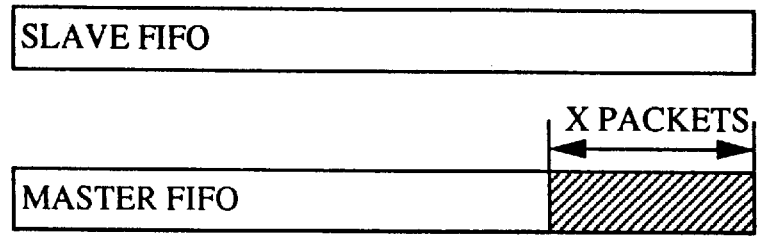
FIGS. 7A–7C illustratively represent the contents of master and slave FIFO memories at various stages of the process of a FIFO equalization process.

Upon beginning the FIFO equalization routine, master state machine 480 waits until the first byte of a first data packet from port Z enters master input packet buffer 492. Master state machine 480 then issues a detection pulse, which is received and recognized by slave state machine 482 before the first byte of the first data packet reaches master FIFO 486 and slave FIFO 488. Slave state machine 482 then enables the previously cleared slave FIFO 488 to begin receiving data packets (i.e., the first data packet) from slave input packet buffer 496. Upon issuing the detection pulse, master state machine 480 determines the number of data packets (e.g., "X") currently in master FIFO 486 and loads this value into packet sync counter 497. Because slave FIFO 488 is not allowed to begin receiving packets until after the detection pulse is generated by master state machine 480, at the time the detection pulse is issued there are "X" packets within master FIFO 486 but none within slave FIFO 488. This situation is depicted in FIG. 7A, which illustratively represents the "X" packets latched within master FIFO 486 and the absence of packets within slave FIFO 488.

Figure 7B:
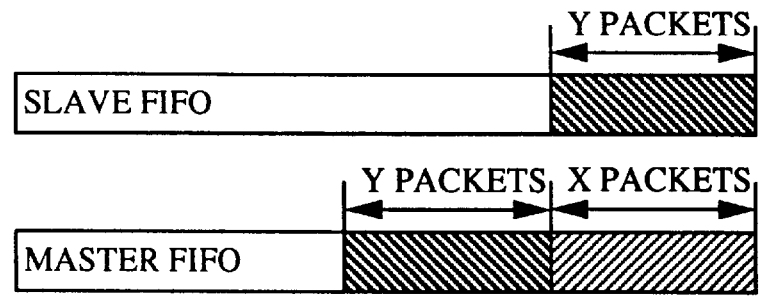

After slave FIFO 488 is enabled to receive data packets master and slave input packet buffers 492 and 496 furnish the same sequence of data packets for accumulation by master FIFO 486 and slave FIFO 488. If an identical set of "Y" packets are accumulated by master and slave FIFOs 486 and 488 prior to any packets being "consolidated" (i.e., output) by master FIFO 486, then the master and slave FIFOs includes the sets of data packets shown in FIG. 7B. In particular, master FIFO 486 contains the "X" packets originally latched therein, as well as the "Y" additionally accumulated packets. In contrast, slave FIFO 488 contains only the "Y" packets accumulated after being enabled to receive packets.

Figure 7C:
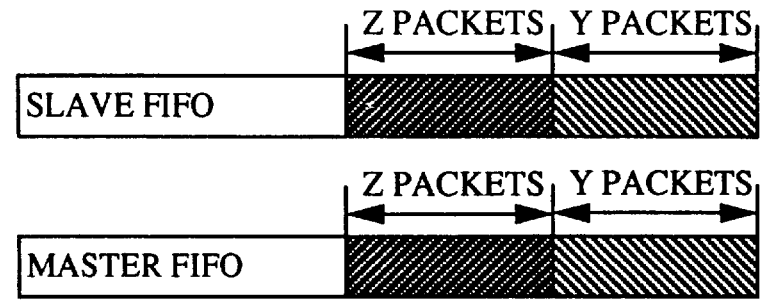

Because master PIM 462A is "on-line" and thus required to supply data packets to consolidation bus 424, data packets continue to be transferred from master FIFO 486 to consolidation bus driver 464A via master output packet buffer 500. Each time a packet is transferred (i.e., read) from master FIFO 486 to master output packet buffer 500, packet counter 497 is decremented from its original count of "X." After "X" packets are output from master FIFO 486 without any being output by slave FIFO 488, the count registered by packet sync counter 497 is zero. At this time an identical set of packets are contained within master and slave FIFOs 486 and 488; that is, master and slave FIFOs 486 and 488 are "equalized." This equalized state is illustratively represented by FIG. 7C, which assumes the accumulation of a set of "Z" packets by master and slave FIFOs 486 and 488 during the period in which the "X" packets were transferred out of master FIFO 486.

After equalization of master and slave FIFOs 486 and 488, master state machine 480 signals slave state machine 482 that it is ready to transfer a packet to the master output packet buffer 500. This signal serves as an indication to slave FIFO 488 to also eject a packet, which is provided to slave output packet buffer 508. DISCO controller 436 may then compare the output of the master output packet buffer 500 and slave output packet buffer 508 in order to ascertain whether the two consolidation paths are yielding the same data. In a preferred embodiment a checksum of each of the data packets output from master and slave output packet buffers 500 and 508 is latched and stored within master and slave checksum registers 478 and 490. In this implementation DISCO controller 436 is programmed to compare the contents of checksum register 478 to checksum register 490, and to thereby determine whether a fault condition exists. This process is repeated for each of the parallel-connected consolidation paths on master and slave interface cards 462A and 462B.

Figure 8:
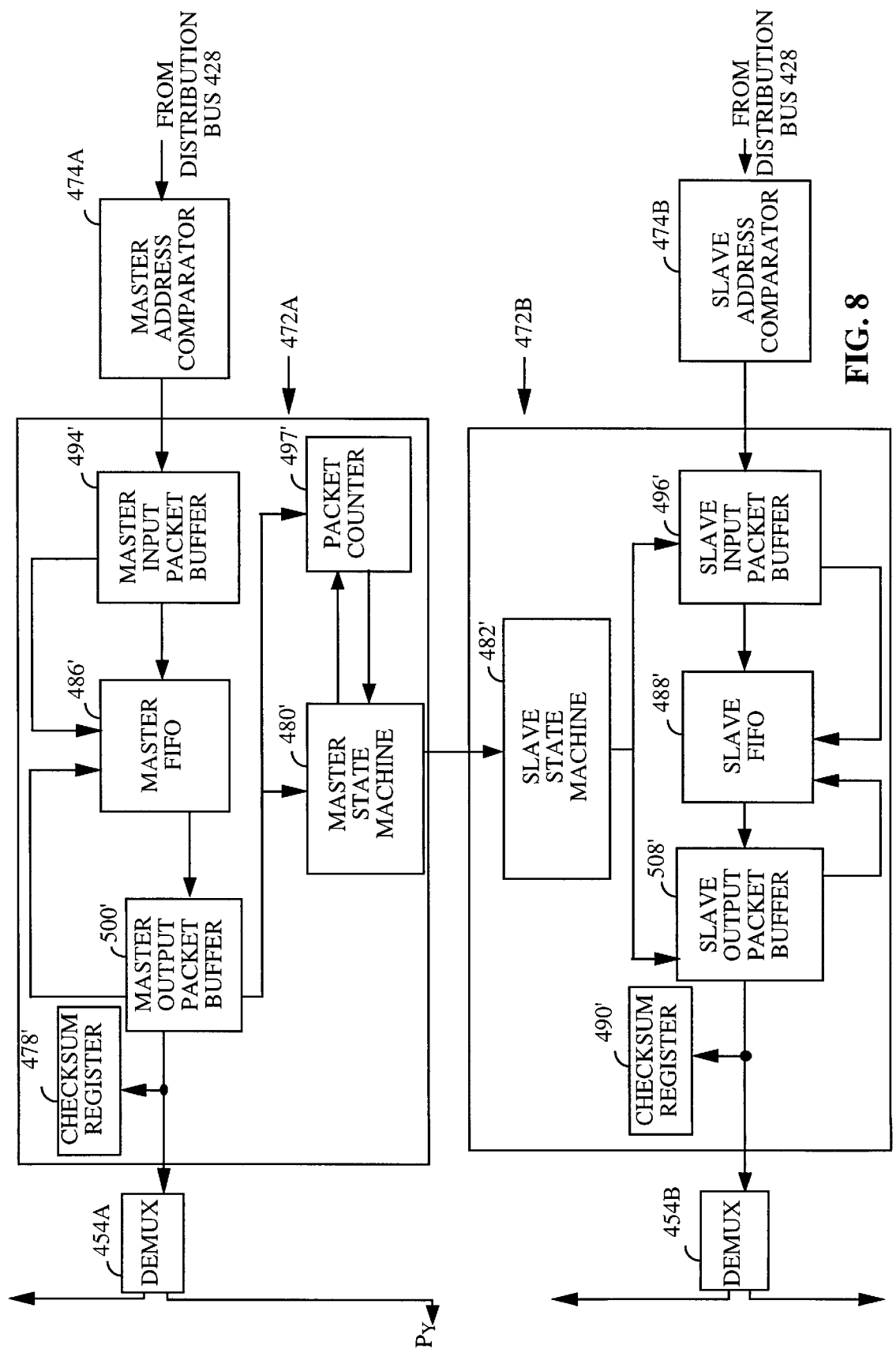
FIG. 8 provides a detailed view of a distribution packet interface module (PIM) of a master interface card connected in parallel to a distribution PIM of a slave interface card.

Turning to FIG. 8, the process of equalizing distribution packet interface modules (PIMs) 472A and 472B incorporated within corresponding distribution paths of master and slave interface cards will now be described. For convenience, primed reference numerals have been used to identify those elements within master and slave distribution PIMs 472A and 472B substantially identical to corresponding elements within consolidation PIMs 462A and 462B (FIG. 6). Once equalization between master and slave distribution PIMs 472A and 472B is achieved, DISCO controller 436 may test the distribution section of the master interface card by comparing the checksums stored in master and slave checksum registers 478' and 490'. It should be noted that because the consolidation and distribution sections of each interface card operate independently, the consolidation and distribution sections of each master interface card may be tested sequentially or simultaneously.

In FIG. 8, distribution PIM 472A corresponds to the master interface card, and slave distribution PIM 472B corresponds to the slave interface card. In order to enhance clarity, zero pad network 470 (see FIG. 5B) is not shown within either of the master or slave distribution paths of FIG. 8. During testing of the distribution section the master card is assumed to be "on-line" and normally processing data. That is, demultiplexer 454A of the master interface card couples data packets from master distribution PIM 472A to port $P_y$ in the usual way. During testing of the slave interface card, data packets from the distribution section of the off-line slave interface are not made available to the port $P_y$ or other signal port. That is demultiplexer 454B does not couple data packets from slave distribution PIM 472B to port $P_{y'}$.

DISCO controller 436 initiates testing by setting slave address comparator 474B to accept from DISCO distribution bus 428 data packets with the same addresses as those specified within master address comparator 474A. Next, master and slave distribution PIMs 472A and 472B are equalized using the same procedure employed to equalize master and slave consolidation PIMs 462A and 462B (FIG. 6). After equalization has been established, DISCO controller 436 compares the checksums of data packets output from master and slave output packet buffers 500' and 508' stored within checksum registers 478' and 490'.

After DISCO controller 436 has concluded testing, the slave distribution interface card can be brought "on-line" and the master distribution path of FIG. 8 can be taken "off-line." The transition involves disconnecting the master distribution path from the port $P_y$, while simultaneously establishing a connection of the slave distribution path thereto in a way which prevents the loss or duplication of any data packets accumulated within master and slave distribution FIFOs 486' and 488'. (Note that as in the case of the consolidation testing, at the termination of the distribution path testing, master and slave distribution FIFOs 486' and 488' contain the same data.) The process of taking the master distribution path "off-line" is initiated when DISCO controller 436 instructs master distribution PIM 472A to prevent its bus drivers (not shown) from providing data within master output packet buffer 500' to port $P_y$. At this time master distribution PIM 472A also sends a sync pulse to slave distribution PIM 472B, which causes slave distribution PIM 472B to enable it's drivers (not shown) to provide data from slave packet output buffers 508' to the port $P_y$. Upon receipt of the sync pulse slave distribution PIM 472B resets slave state machine 482', which may later be reconfigured to function as a master state machine. The transition of bus control from the master to the slave inherently requires some amount of transition time. During the transition time, the bus drivers (not shown) of master and slave distribution PIMs 472A and 472B are both prevented from transferring data packets to the port $P_y$. During this time, master and slave FIFOs 486' and 488' may continue to receive data packets from address comparators 474A and 474B via input packet buffers 494' and 496'. Accordingly, DISCO controller 436 only initiates switchover from the master distribution path to the slave distribution path when less than a predetermined number of data packets are contained within master and slave FIFOs 486' and 488'. This ensures that master and slave FIFOs 486' and 488' will not overflow within the predetermined interval following issuance of the sync pulse, during which time master and slave FIFOs 486' and 488' are prevented from releasing any data packets.

VI. Summary of On-Line Test Procedure

In order to further illustrate the on-line test procedure contemplated by the invention, this section summarizes the steps executed during an exemplary roving test of a set of DISCO consolidation paths. In this section the term "master" refers to the consolidation path which is actively processing data packets prior to initiation of the on-line test procedure. Similarly, the term "slave" refers to a consolidation path on the RTIC which is off-line during the on-line test procedure. After completion of testing, the slave is configured to become an active consolidation path. In what follows the term "sync pulse" refers to signals generated by the master as a means of instructing the slave to perform certain functions.

Consolidation Test Sequence

1) The DISCO controller configures an off-line interface card to be a RTIC and resets a first consolidation path thereof to be a slave ready for on-line test.

2) The DISCO controller configures the multiplexer and address comparator of the slave such that the slave receives the same data as the master.

3) The DISCO controller configures the state machine within the slave to be responsive to sync pulse commands from the master.

5) The DISCO controller instructs the master consolidation PIM to initiate the FIFO equalization routine.

6) The master consolidation PIM provides a sync pulse to the slave. In response to the sync pulse, the slave state machine enables the slave input packet buffer to provide data packets to the slave FIFO. This sync pulse also may enable the checksum circuitry of the slave. However, no data packets are provided to the checksum circuitry of the slave until equalization between the master and slave FIFOs is achieved (See FIGS. 7A–7C).

7) After FIFO equalization has been achieved, a sync pulse is sent from the master to the slave state machine each time the master PIM outputs a data packet. This causes the slave FIFO to "dummy dump" the same data packet. The term "dummy dump" is employed because the data packets which are output by the slave output packet buffer are not forwarded to the slave consolidation bus driver, but are merely used within slave checksum circuitry to generate a checksum for comparison with a corresponding master checksum.

8) The checksum stored in the master and slave checksum registers may be compared to discern whether the master and slave interface card are producing the same data.

9) At the completion of the on-line test procedure, the DISCO controller may instruct the master state machine to send, upon entry of the next packet into the master packet output buffer, a sync pulse to the slave state machine. The DISCO controller configures the slave to be capable of being placed "on-line" by enabling the slave consolidation bus driver to begin receiving data packets from the slave output packet buffer, and to begin providing data packets to the consolidation bus upon reception of the sync pulse from the master.

It should be noted that signaling formats other than that set forth above may be employed in accordance with the present invention. It is also observed that signaling similar to that described in this section may occur between master and slave distribution paths during on-line test in the distribution mode.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

We claim:

1. In a communication system having at least one system entity and having an interconnection subsystem for routing data packets between system entities over a plurality of signal lines, said interconnection subsystem including a plurality of interface units each coupled to a set of said plurality of signal lines, a method of providing redundancy and testing capabilities of said interface units comprising the steps of:

receiving at a first interface unit of said plurality of interface units a first sequence of said data packets;

storing within said first interface unit said first sequence of data packets to produce a first stored data accumulation;

producing within said first interface unit a second sequence of said data packets based on said first sequence of said data packets;

transmitting from said first interface unit said second sequence of said data packets;

storing within a second interface unit said first sequence of data packets to produce a second stored data accumulation;

producing within said second interface unit a third sequence of said data packets based on said first sequence of said data packets when said first stored data accumulation and said second data accumulation contain an equal number of said data packets; and comparing said second and said third sequence of data packets and indicating an error has occurred if said first and third sequences are not identical.

2. The method of claim 1 further comprising the steps of:

detecting when a first packet within said first sequence of packets is received by said first and said second interface units, and determining a number of other data packets stored within said first interface unit upon detection of said first packet, wherein said number of other data packets is produced within said first interface unit before said third sequence of said data packets is produced within said second interface unit.

3. The method of claim 1 wherein said step of comparing comprises the steps of:

creating a first checksum corresponding to said first sequence;

creating a second checksum corresponding to said second sequence; and comparing said first and second checksums.

4. In a communication system within which is disposed an interconnection subsystem for routing data packets between a plurality of signal lines, said interconnection subsystem including a plurality of packet consolidation interfaces for multiplexing said data packets from a plurality of said signal lines into a higher-rate signal line, a method of testing said packet consolidation interfaces comprising the steps of:

connecting first and second of said packet consolidation interfaces to a selected one of said signal lines in order that said first and second packet consolidation interfaces receive an identical sequence of said data packets;

equalizing said first and second packet consolidation interfaces in order that said first packet consolidation interface accumulates a first set of said data packets and said second packet consolidation interface accumulates a second set of data packets identical to said first set of data packets; and latching, at output ports of said first and second packet consolidation interfaces, selected information included within corresponding ones of said data packets from said first and second sets of said data packets and comparing said selected information latched from said corresponding ones of said data packets;

wherein a difference between said selected information latched from said corresponding ones of said data packets indicates said first packet consolidation interface differs from said second packet consolidation interface.

5. The method of claim 4 wherein said step of equalizing includes the step of:

detecting when a first packet within said first set of said data packets is received by said first packet consolidation interface; and determining the number of other of said data packets within said first packet consolidation interface upon detection of said first packet.

6. The method of claim 4 wherein said selected information latched from said corresponding ones of said data packets comprises checksum information.

7. The method of claim 4 wherein only said first packet consolidation interface drives said higher-rate signal line.

8. In a communication system within which is disposed an interconnection subsystem for routing data packets between a plurality of signal lines, said interconnection subsystem including a plurality of packet distribution interfaces for allocating data packets from a high-rate signal line to a plurality of lower-rate signal lines, a method of testing said packet distribution interfaces comprising the steps of:

configuring first and second of said packet distribution interfaces to receive an identical sequence of said data packets from said high-rate signal line;

equalizing said first and second packet distribution interfaces in order that said first packet distribution interface accumulate a first set of said data packets and said second packet distribution interface accumulate a second set of data packets identical to said first set of data packets; and latching, at output ports of said first and second packet distribution interfaces, selected information included within corresponding ones of said data packets from said first and second sets of said data packets and comparing said selected information latched from said corresponding ones of said data packets;

wherein a difference between said selected information latched from said corresponding ones of said data packets indicates said first packet distribution interface differs from said second packet distribution interface.

9. The method of claim 8 wherein said step of configuring includes the step of setting a first address comparator of said first packet distribution interface, and a second address comparator of said second packet distribution interface, to only accept ones of said data packets having destination addresses within a predefined range.

10. The method of claim 8 wherein only said first packet distribution interface drives said lower-rate signal line.

11. In a communication system within which is disposed an interconnection subsystem for routing data packets between a plurality of signal lines, said interconnection subsystem including a plurality of packet distribution interfaces for allocating data packets from a high-rate signal line to a plurality of lower-rate signal lines, a method of providing redundancy among said interface units comprising the steps of:

allocating by a first one of said interface units selected data packets from said high-rate signal line to a first of said lower-rate signal lines;

configuring a roving one of said interface units to monitor said selected data packets;

equalizing said first and said roving ones of said interface units so that first and second identical sets of data packets from said high-rate signal line are accumulated within each;

latching, at predefined locations within said first and said roving ones of said interface units, selected information included within said first and second sets of data packets and comparing said selected information latched from said first and second sets of data packets;

disabling said first one of said interface units from allocating said selected data packets to said first of said lower-rate signal lines; and allocating by said roving one of said interface units selected data packets from said high-rate signal line to said first of said lower-rate signal lines.

12. In a communication system within which is disposed an interconnection subsystem for routing data packets between a plurality of signal lines, said interconnection subsystem including a plurality of packet consolidation interfaces for allocating data packets from a plurality of lower-rate signal lines to a high-rate signal line, a method of providing redundancy among said interface units comprising the steps of:

allocating by a first one of said interface units data packets from a first of said lower-rate signal lines to said high-rate signal line;

connecting a roving one of said interface units to said first of said lower-rate signal lines;

equalizing said first and said roving ones of said interface units so that first and second identical sets of data packets from said first of said lower-rate signal lines are accumulated within each;

latching, at predefined locations within said first and said roving ones of said interface units, selected information included within said first and second sets of data packets and comparing said selected information latched from said first and second sets of data packets;

disabling said first one of said interface units from allocating said selected data packets to said high-rate signal line; and allocating by said roving one of said interface units data packets from said first of said lower-rate signal lines to said high-rate signal line.

13. In a communication system within which is disposed an interconnection subsystem for routing data packets between a plurality of signal lines, said interconnection subsystem including a plurality of interface units coupled to said signal lines, a system for testing said interface units comprising:

a multiplexer for connecting first and second of said interface units to receive first and second identical sequences of said data packets from a first of said signal lines;

an equalization circuit for equalizing said first and second interface units so that said first interface unit accumulates a first set of said data packets and said second interface unit accumulates a second set of data packets identical to said first set of data packets;

first and second output interfaces, respectively disposed at predefined locations within said first and second interface units, for respectively latching corresponding data packets within said first and second sets of data packets; and a comparator for comparing said corresponding data packets latched within said first and second output interfaces and for generating an error signal when a difference exists therebetween;

wherein generation of said error signal indicates that said first interface unit is operating differently from said second interface unit.

14. The system of claim 13 wherein said equalization circuit includes:

a detection circuit for detecting when a first packet within said first identical sequence of said data packets is received by said first interface unit;

a counter circuit for determining and storing the number of other of said data packets within said first interface unit upon detection of said first packet; and a control circuit for outputting said other number of said data packets from said first interface unit while said first and second identical sequences of data packets are being received by said first and second interface units.

15. In a communication system within which is disposed an interconnection subsystem for routing data packets between a plurality of signal lines, said interconnection subsystem including a plurality of interface units coupled to said signal lines, a system for providing redundancy among said interface units comprising:

- a multiplexer network for connecting a first one of said interface units and a roving one of said interface units to a first of said signal lines;
- a equalization circuit for equalizing said first and said roving one of said interface units so that first and second identical sets of data packets from said first signal line are accumulated within said first and said roving one of said interface units;
- first and second output interfaces, respectively disposed at predefined locations within said first and said roving ones of said interface units, for latching selected information included within said first and second identical sets of data packets;
- a comparator for comparing said selected information latched within said first and second output interfaces and for generating an error signal when a difference exists therebetween; and
- an interconnection controller means for notifying a communication system controller upon generation of said error signal.

* * * * *